United States Patent [19]
Naiki et al.

[11] Patent Number: 5,371,632
[45] Date of Patent: Dec. 6, 1994

[54] SINGLE ASPHERICAL PLANO-CONVEX COLLIMATOR LENS

[75] Inventors: Toshio Naiki, Toyohashi; Satoshi Iwasaki, Toyokawa, both of Japan

[73] Assignee: Minolta Co., Ltd., Osaka, Japan

[21] Appl. No.: 98,610

[22] Filed: Jul. 28, 1993

[30] Foreign Application Priority Data

Jul. 31, 1992 [JP] Japan ................... 4-224967

[51] Int. Cl.⁵ ............................................. G02B 13/18
[52] U.S. Cl. ................................... 359/719; 359/718
[58] Field of Search ................................ 359/718, 719

[56] References Cited

U.S. PATENT DOCUMENTS

| | | | |
|---|---|---|---|
| 3,544,198 | 12/1970 | De Metz et al. | 359/719 |
| 4,592,627 | 6/1986 | Smid | 359/719 |
| 4,613,212 | 9/1986 | Norikazu | 359/719 |
| 4,657,352 | 4/1987 | Suda et al. | 359/719 |
| 4,863,248 | 9/1989 | Saka | 359/718 |

FOREIGN PATENT DOCUMENTS 61-132915  6/1986  Japan .
63-192006  8/1988  Japan .

*Primary Examiner*—Scott J. Sugarman
*Attorney, Agent, or Firm*—Price, Gess & Ubell

[57] ABSTRACT

A collimator lens system has a single plano-convex lens and a plane parallel plate. An aspherical surface of the single plano-convex lens is convex to the magnification-larger-than-unity side. The collimator lens system fulfills the following conditions:

$$1.68 < n < 1.89$$

$$2.631 \left( 0.85 - \frac{1}{n(n-1)} \right) < \frac{d + dg}{f} < 2.631 \left( 1 - \frac{1}{n(n-1)} \right)$$

where n represents a refractive index of the single plano-convex lens, d represents an axial thickness of the single plano-convex lens, f represents a focal length of the single plano-convex lens and dg represents a thickness of the plane parallel plate.

6 Claims, 13 Drawing Sheets

Spherical aberration
Sine condition

Astigmatism

Distortion

Lateral chromatic aberration

Fig. 7A Spherical aberration / Sine condition

Fig. 7B Astigmatism

Fig. 7C Distortion

Fig. 7D Lateral chromatic aberration

Spherical aberration

Astigmatism  Sine condition

Distortion

Lateral chromatic aberration

Spherical aberration / Sine condition    Astigmatism    Distortion    Lateral chromatic aberration

Fig. 20A 
TRN −0.03750

Fig. 20B 
TRN −0.01875

Fig. 20C 
TRN 0.0

Fig. 21A 
TRN −0.03750

Fig. 21B 
TRN −0.01875

Fig. 22

Fig. 23A 
Spherical aberration — Sine condition

Fig. 23B 
Astigmatism

Fig. 23C 
Distortion

Fig. 23D 
Lateral chromatic aberration

Fig. 25A  TRN -0.03750

Fig. 25B  TRN -0.01875

Spherical aberration / Sine condition

Fig. 27B

Astigmatism

Fig. 27C
Distortion

Fig. 27D

Lateral chromatic aberration

Fig. 28A

TRN −0.01250

Fig. 28B

TRN −0.006250

Fig. 28C

TRN 0.0

Fig. 29A

TRN −0.01250

Fig. 29B

TRN −0.006250

Fig. 35A — Spherical aberration / Sine condition
Fig. 35B — Astigmatism
Fig. 35C — Distortion
Fig. 35D — Lateral chromatic aberration

SINGLE ASPHERICAL PLANO-CONVEX COLLIMATOR LENS

BACKGROUND OF THE INVENTION

1. Field of the Invention

The present invention relates to an image forming optical system comprising a single aspherical plano-convex collimator lens for use as a pickup optical system for an optical disk or as an optical system for use in a laser beam printer.

2. Description of the Prior Art

For a lens system used for reproducing signals recorded on optical disks, a large aperture with a numerical aperture NA of approximately 0.45 to 0.5 is required when the light source is a semiconductor laser. It is also required that axial aberrations should not exceed the diffraction limit. Moreover, in order to cope with automatic focusing or tracking, it is required that the number of lens elements should be as small as possible.

Lens systems fulfilling these requirements have already been proposed in Japanese Laid-open Patent Applications Nos. S60-181714, S61-88213, S61-132915 and S63-192006. These lens systems are all excellent lens systems each of which has achieved its object with a single lens by use of the recent progress in aspherical surface technology.

Regarding single aspherical collimator lenses made by a glass molding method, there is a constraint condition for each of the lens material (on which refractive index depends), the axial thickness and the curvature. These conditions are due to the manufacture method.

A lens system disclosed by the above-mentioned Japanese Laid-open Patent Application No. S61-88213 fulfills the following conditions (1) to (3):

$$1.2 < q < 1.5 \quad (1)$$

$$1.68 < n \quad (2)$$

$$0 < dg \quad (3)$$

where q is defined by $$q = \frac{(d + dg) \cdot (1 - NA^2)}{f(n-1)^3},$$

f represents a focal length of the single lens, d represents an axial thickness thereof, n represents a refractive index thereof, NA represents a numerical aperture thereof, and dg represent a thickness of a plane parallel plate.

In this prior art, by setting $(d+dg)/f$ in accordance with the condition (1), coma is restrained, and the unfulfilled amount of sine condition is reduced to zero. Specifically, coma in the vicinity of the optical axis is removed by preventing the maximum image height of the single plano-convex lens from decreasing, and the unfulfilled amount of sine condition in the pupil is reduced to zero.

However, in the aspherical plano-convex lens fulfilling the above conditions, a ratio d/D of the thickness d to the effective aperture D is inevitably large. This is because d+dg is inevitably large in a lens having a large focal length since $(d+dg)/f$ should be within a predetermined range in order to bring coma into an excellent condition. For example, in an embodiment which is a collimator lens where dg=0.25, the focal length f is long (7 to 13) and the axial thickness d is extremely large (4.2 to 7.8).

When the lens is processed by press molding, since the cut off amount at the process where the lenses are cut off for determining the center is large, the cost of lens manufacture is high. When decentering occurs in the lenses which have been cut off for determining the center, the angle of view increases because of the decentering. In a lens where the ratio d/D of the axial thickness d to the effective aperture D is large, the amount of lateral aberrations due to the increase in angle of view is more apt to be large than in a lens where the ratio d/D is small. That is, the amount of aberrations increases highly responsively to a change in angle of view. Since a lens where the ratio d/D is large must be designed so that lateral aberrations are restrained in a large view angel range for this reason, the degree of freedom in lens designing such as the selection of a lens material is limited.

If the lens where the ratio d/D is large is designed so that lateral aberrations are restrained only in a small view angle range, the assembly will be extremely difficult since it is necessary to attach the lens to a lens barrel with a high positioning accuracy so that the decentering amount from the optical axis is small.

Generally, a single lens is positioned with either of the effective surfaces as a reference surface. This is because edge surfaces are not highly precisely processed. For this reason, even though the finished lens has an ideal shape, the surface reverse to the positioning surface decenters due to the work accuracy of a supporting portion of the lens barrel. Although the element of the inclination is the same whether the ratio d/D is large or small, the parallel decentering amount is largely different.

SUMMARY OF THE INVENTION

An object of the present invention is to provide a single aspherical plano-convex collimator lens having a smaller ratio of an axial thickness to effective aperture where coma is extremely excellently corrected.

To achieve the above-mentioned object, a collimator lens system is provided with from a magnification-larger-than-unity side a single plano-convex lens convex to the magnification-larger-than-unity side and a plane parallel plate, wherein the convex surface of the single plano-convex lens is aspherical and wherein the following conditions are fulfilled:

$$1.68 < n < 1.89$$

$$2.631\left(0.85 - \frac{1}{n(n-1)}\right) < \frac{d + dg}{f} < 2.631\left(1 - \frac{1}{n(n-1)}\right)$$

where n represents a refractive index of the single plano-convex lens, d represents an axial thickness of the single plano-convex lens, f represents a focal length of the single plano-convex lens and dg represents a thickness of the plane parallel plate.

The present invention results from a finding that in optimizing an axial thickness for a limited lens material (refractive index), a condition to reduce coma is univocally decided by a relationship among the refractive index, axial thickness and focal length. Specifically, in designing a collimator lens having a certain focal length, by deciding either the lens material (refractive index) or the axial thickness, the optimal value for the other is automatically decided.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

A first implementation of the present invention is an image forming optical system comprising from a magnification-larger-than-unity side (left side) a single plano-convex lens convex to the magnification-larger-than-unity side and a plane parallel plate. The single plano-convex lens is a collimator lens whose convex surface is aspherical. The first implementation fulfills the following conditions (4) and (5):

$$1.68 < n < 1.89 \tag{4}$$

$$2.631\left(0.85 - \frac{1}{n(n-1)}\right) < \frac{d + dg}{f} < 2.631\left(1 - \frac{1}{n(n-1)}\right) \tag{5}$$

where n represents a refractive index of the single plano-convex lens, d represents an axial thickness of the single plano-convex lens, f represents a focal length of the single plano-convex lens and dg represents a thickness of the plane parallel plate.

Preferably, the following condition (6) is further fulfilled:

$$2.631\left(0.90 - \frac{1}{n(n-1)}\right) < \frac{d + dg}{f} \tag{6}$$

By setting (d+dg)/f in accordance with the condition (6), inward coma is further reduced than in the case where only the above conditions (4) and (5) are fulfilled.

Preferably, the following condition (7) is further fulfilled in place of the condition (6):

$$2.631\left(0.95 - \frac{1}{n(n-1)}\right) < \frac{d + dg}{f} \tag{7}$$

By setting (d+dg) in accordance with the condition (7), inward coma is further reduced than in the case where the above condition (6) is fulfilled.

A second implementation of the present invention is an image forming optical system comprising from the magnification-larger-than-unity side a single plano-convex lens convex to the magnification-larger-than-unity side and a plane parallel plate. The single plano-convex lens is a collimator lens whose convex surface is aspherical. The second implementation fulfills the following conditions (8) and (9):

$$n < 1.68 \tag{8}$$

$$\frac{d + dg}{f} < 2.631\left(1.15 - \frac{1}{n(n-1)}\right) \tag{9}$$

where n represents a refractive power of the single plano-convex lens, d represents an axial thickness of the single plano-convex lens, f represents a focal length of the single plano-convex lens, and dg represents a thickness of the plane parallel plate.

Preferably, the following condition (10) is further fulfilled:

$$\frac{d + dg}{f} < 2.631\left(1.10 - \frac{1}{n(n-1)}\right) \tag{10}$$

By setting (d+dg)/f in accordance with the condition (10), outward coma is further reduced than in the case where only the above conditions (8) and (9) are fulfilled.

Preferably, the following condition (11) is further fulfilled in place of the condition (10):

$$\frac{d + dg}{f} < 2.631\left(1.05 - \frac{1}{n(n-1)}\right) \tag{11}$$

By setting (d+dg)/f in accordance with the condition (11), outward coma is further reduced than in the case where the above condition (10) is fulfilled.

Figure 1:
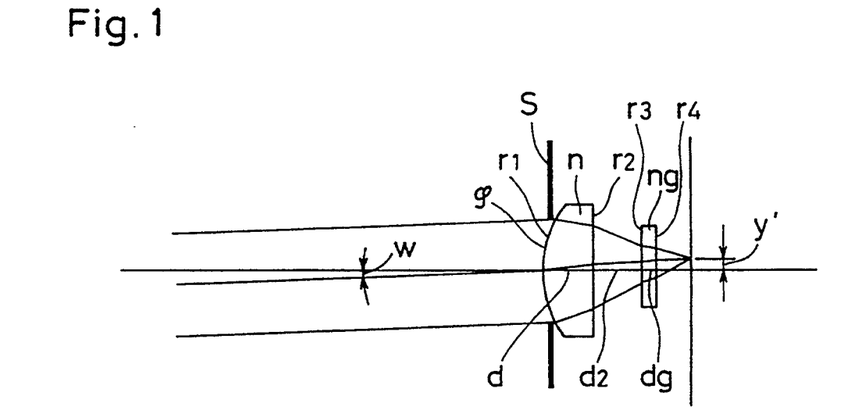
FIG. 1 shows the basic arrangement and optical path of embodiments of the present invention.
Figure 2:
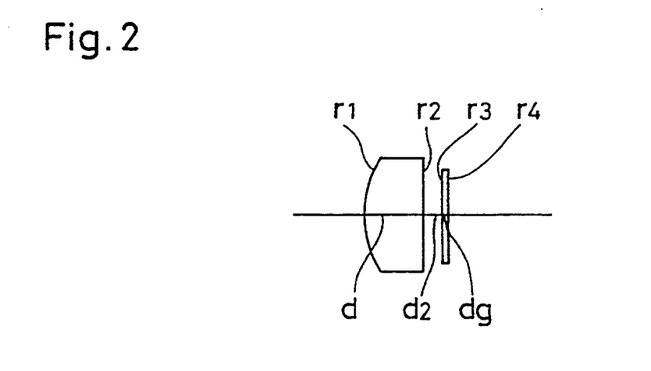
FIG. 2 is a cross-sectional view showing the lens arrangement of a first embodiment of the present invention.
Figures 3A, 3B, 3C:
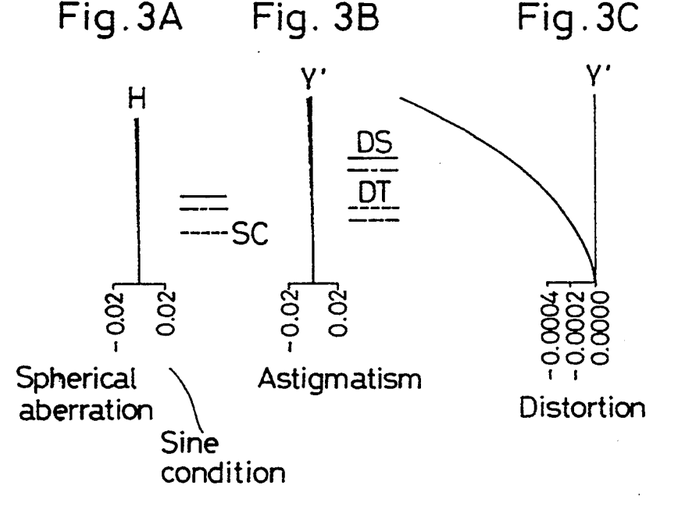
FIGS. 3A to 3D are graphic representations of spherical aberration, astigmatism, distortion and lateral chromatic aberration in the first embodiment of the present invention.
Figure 3D:
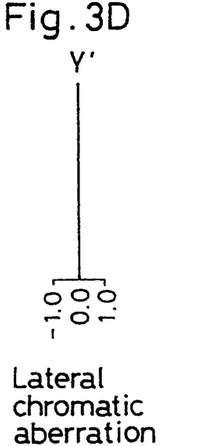
Figure 4A:
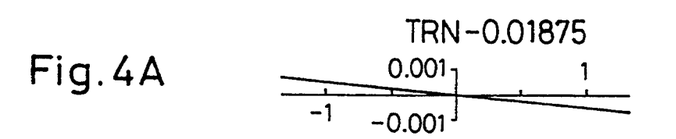
FIGS. 4A to 4C are graphic representations of meridional lateral aberrations on the Gaussian image surface in the first embodiment of the present invention.
Figure 4B:
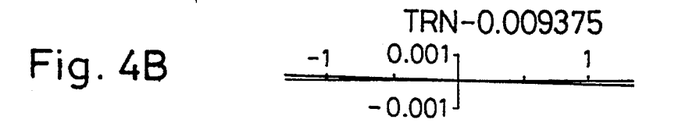
Figure 4C:
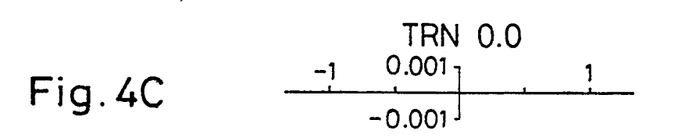
Figure 5A:
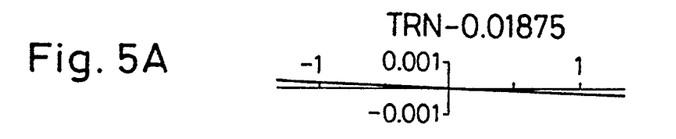
FIGS. 5A and 5B are graphic representations of sagittal lateral aberrations on the Gaussian image surface in the first embodiment of the present invention.
Figure 5B:
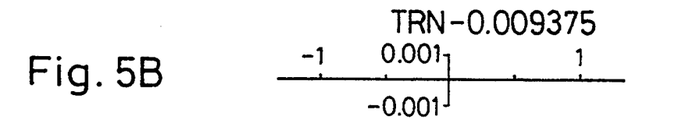
Figure 6:
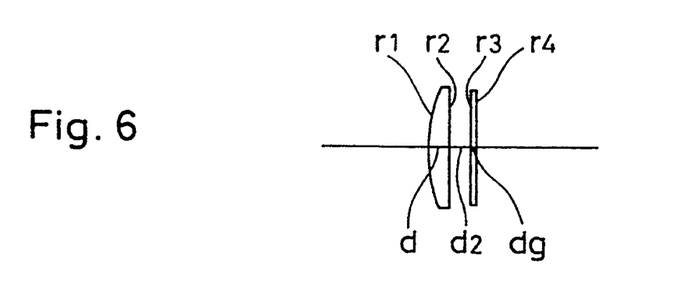
FIG. 6 is a cross-sectional view showing the lens arrangement of a second embodiment of the present invention.
Figures 7A, 7B:
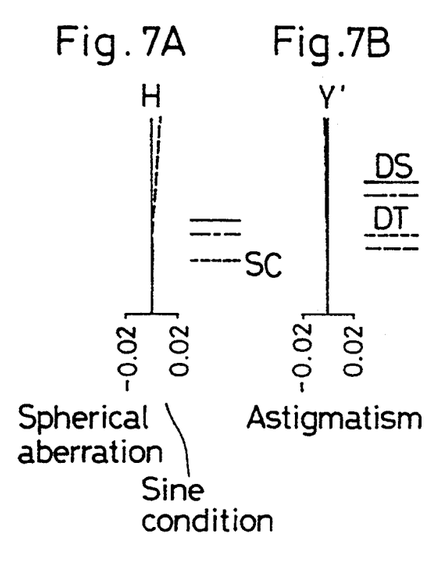
FIGS. 7A to 7D are graphic representations of spherical aberration, astigmatism, distortion and lateral chromatic aberration in the second embodiment of the present invention.
Figure 7C:
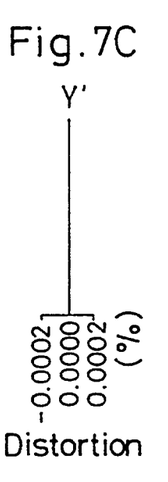
Figure 7D:
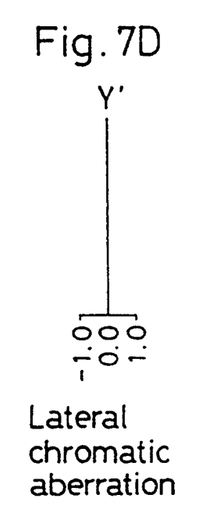
Figure 8A:
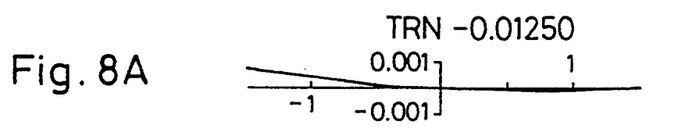
FIGS. 8A to 8C are graphic representations of meridional lateral aberrations on the Gaussian image surface in the second embodiment of the present invention.
Figure 8B:
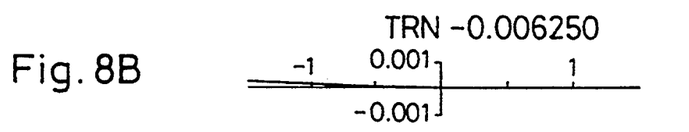
Figure 8C:
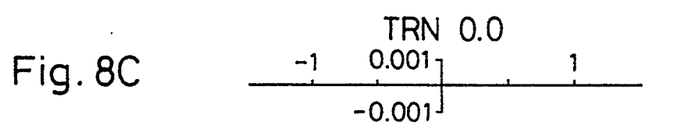
Figure 9A:
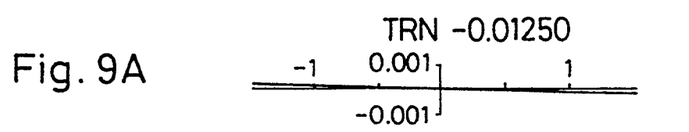
FIGS. 9A and 9B are graphic representations of sagittal lateral aberrations on the Gaussian image surface in the second embodiment of the present invention.
Figure 9B:
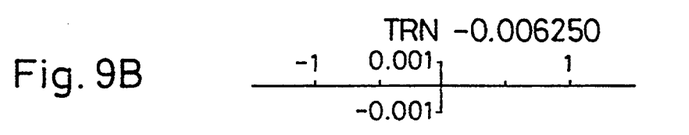
Figure 10:
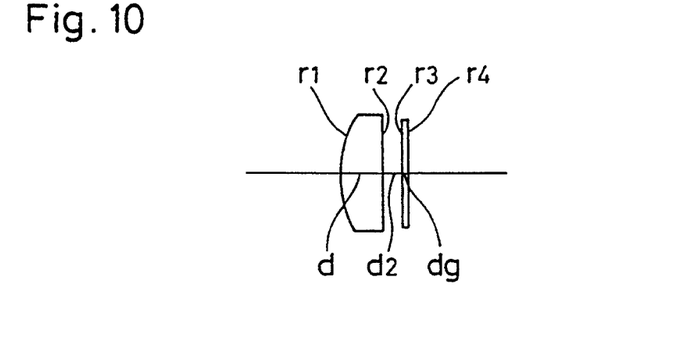
FIG. 10 is a cross-sectional view showing the lens arrangement of a third embodiment of the present invention.
Figures 11A, 11B:
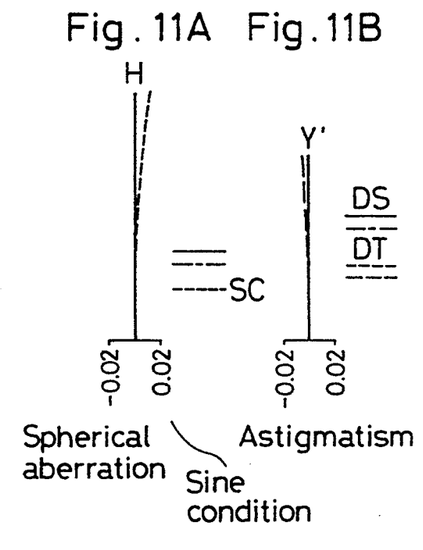
FIGS. 11A to 11D are graphic representations of spherical aberration, astigmatism, distortion and lateral chromatic aberration in the third embodiment of the present invention.
Figure 11C:
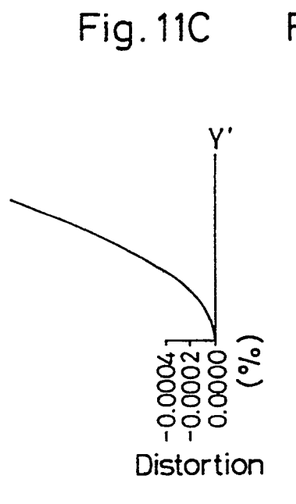
Figure 11D:
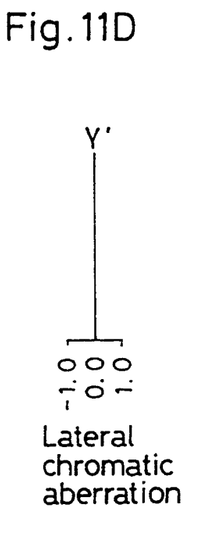
Figure 12A:
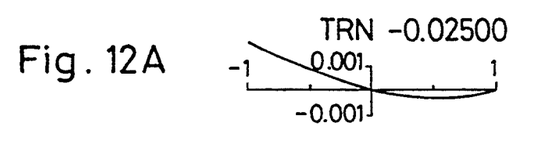
FIGS. 12A to 12C are graphic representations of meridional lateral aberrations on the Gaussian image surface in the third embodiment of the present invention.
Figure 12B:
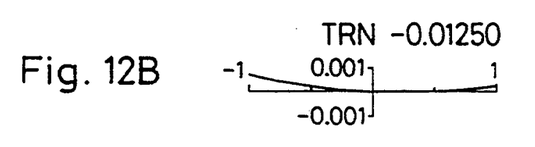
Figure 12C:
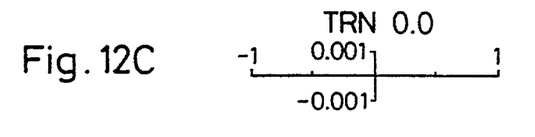
Figure 13A:
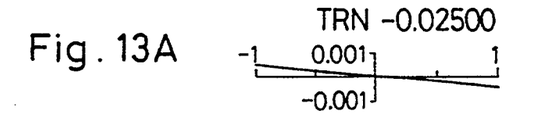
FIGS. 13A and 13B are graphic representations of sagittal lateral aberrations on the Gaussian image surface in the third embodiment of the present invention.
Figure 13B:
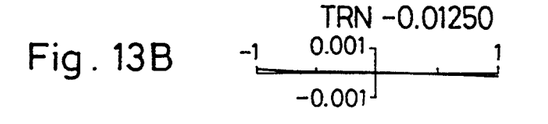
Figure 14:
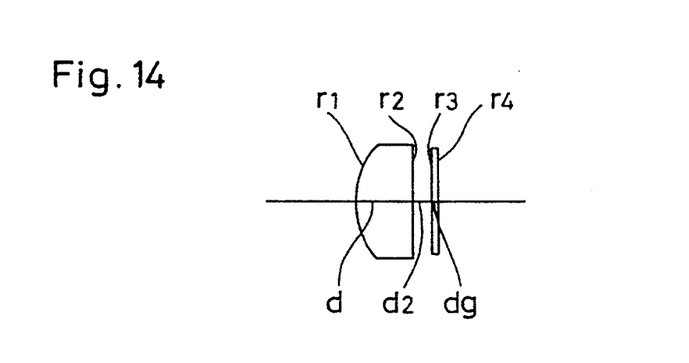
FIG. 14 is a cross-sectional view showing the lens arrangement of a fourth embodiment of the present invention.
Figures 15A, 15B:
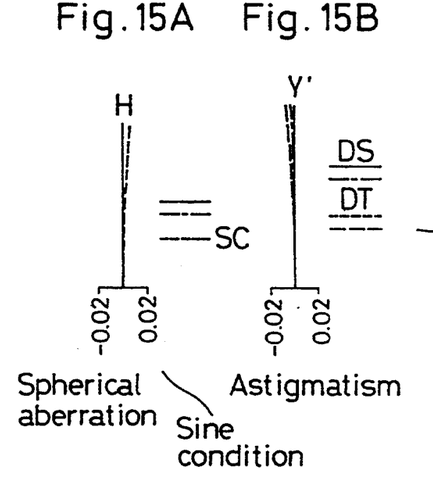
FIGS. 15A to 15D are graphic representations of spherical aberration, astigmatism, distortion and lateral chromatic aberration in the fourth embodiment of the present invention.
Figures 15C, 15D:
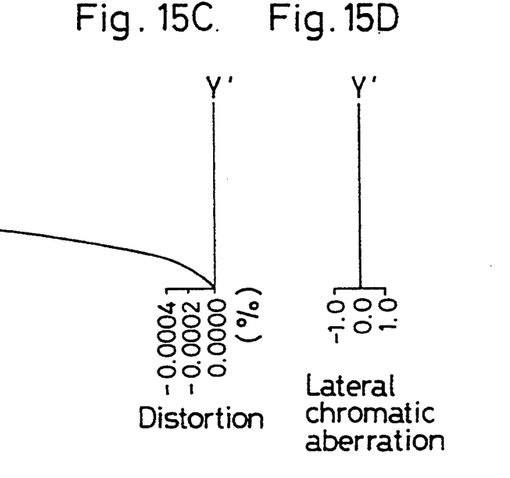
Figure 16A:
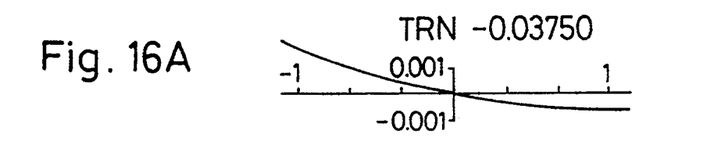
FIGS. 16A to 16C are graphic representations of meridional lateral aberrations on the Gaussian image surface in the fourth embodiment of the present invention.
Figure 16B:
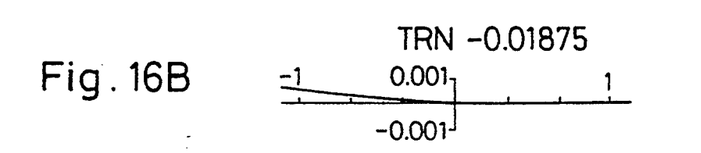
Figure 16C:
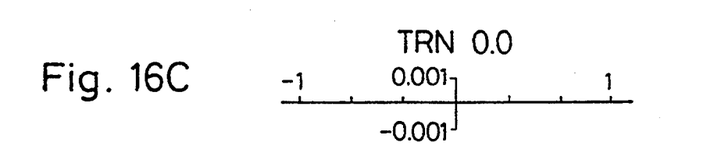
Figure 17A:
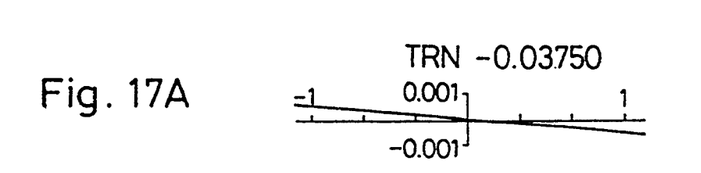
FIGS. 17A and 17B are graphic representations of sagittal lateral aberrations on the Gaussian image surface in the fourth embodiment of the present invention.
Figure 17B:
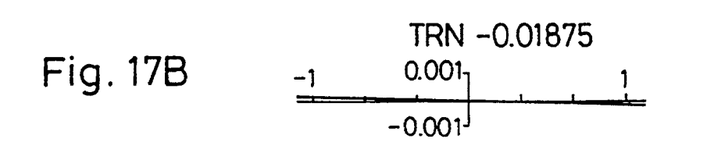
Figure 18:
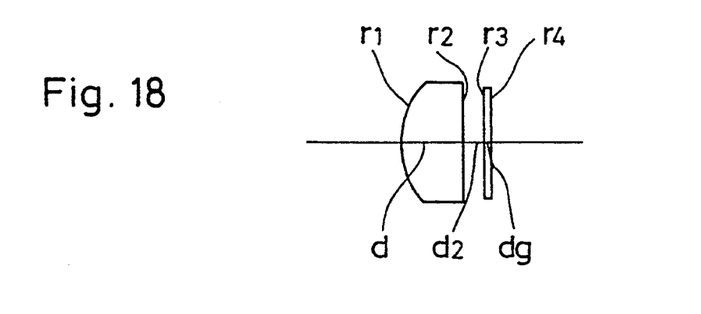
FIG. 18 is a cross-sectional view showing the lens arrangement of a fifth embodiment of the present invention.
Figure 19A:
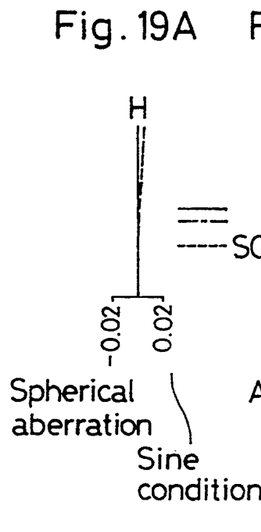
FIGS. 19A to 19D are graphic representations of spherical aberration, astigmatism, distortion and lateral chromatic aberration in the fifth embodiment of the present invention.
Figures 19B, 19C:
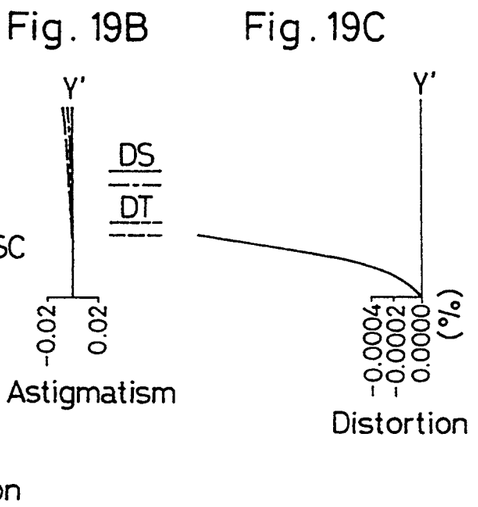
Figure 19D:
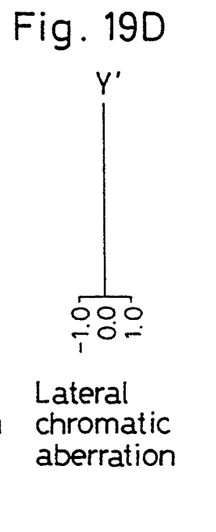
Figure 20A:
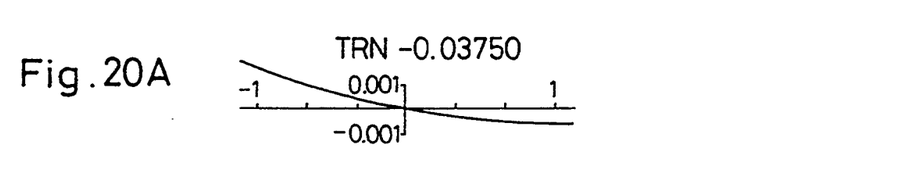
FIGS. 20A to 20C are graphic representations of meridional lateral aberrations on the Gaussian image surface in the fifth embodiment of the present invention.
Figure 20B:
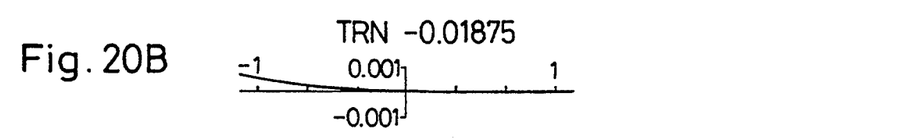
Figure 20C:
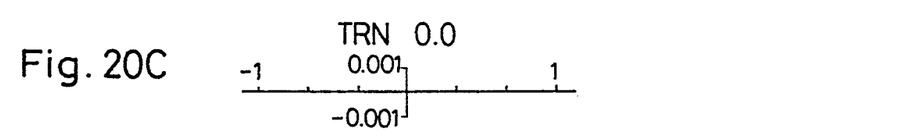
Figure 21A:
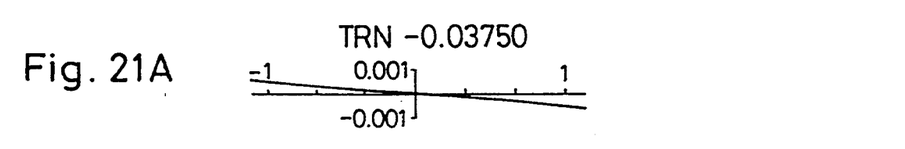
FIGS. 21A and 21B are graphic representations of sagittal lateral aberrations on the Gaussian image surface in the fifth embodiment of the present invention.
Figure 21B:
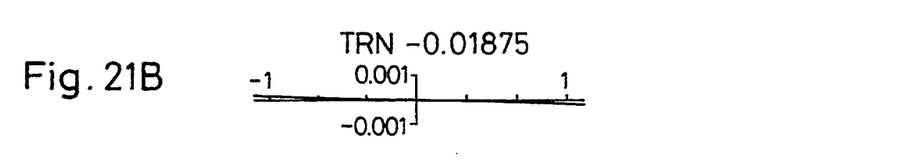
Figure 22:
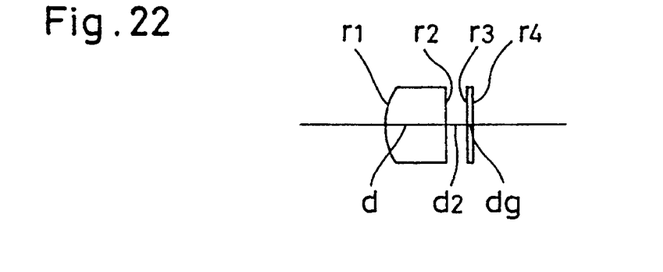
FIG. 22 is a cross-sectional view showing the lens arrangement of a sixth embodiment of the present invention.
Figures 23A, 23B:
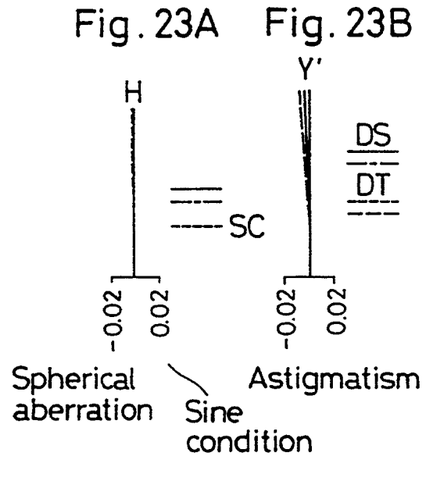
FIGS. 23A to 23D are graphic representations of spherical aberration, astigmatism, distortion and lateral chromatic aberration in the sixth embodiment of the present invention.
Figure 23C:
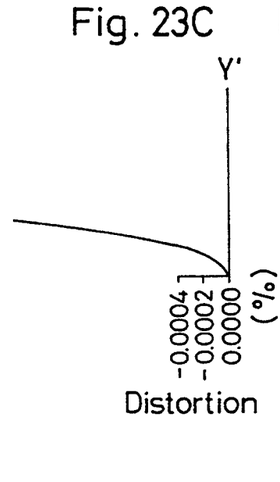
Figure 23D:
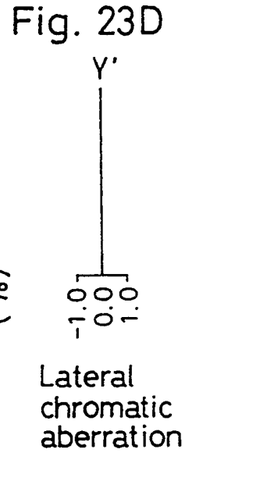
Figure 24A:
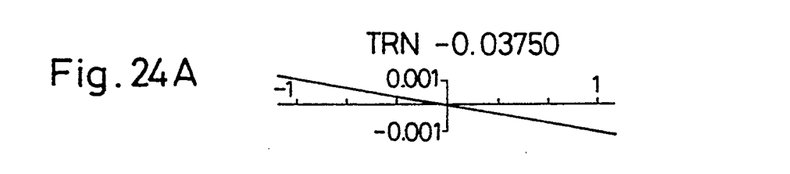
FIGS. 24A to 24C are graphic representations of meridional lateral aberrations on the Gaussian image surface in the sixth embodiment of the present invention.
Figure 24B:
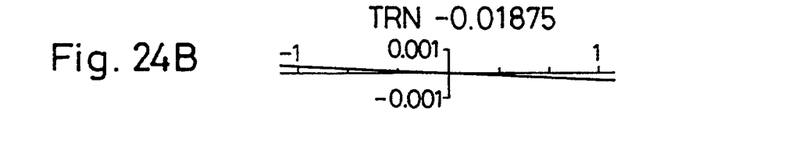
Figure 24C:
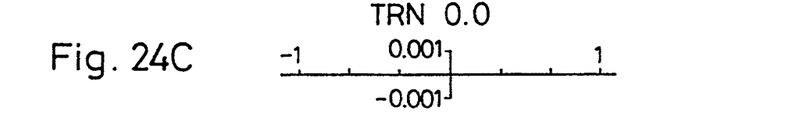
Figure 25A:
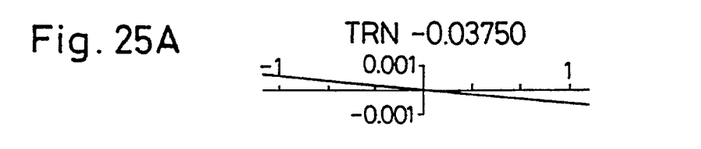
FIGS. 25A and 25B are graphic representations of sagittal lateral aberrations on the Gaussian image surface in the sixth embodiment of the present invention.
Figure 25B:
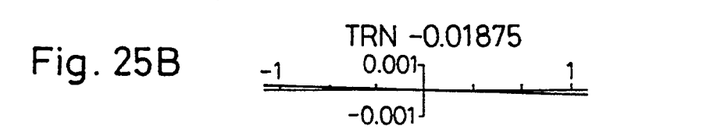

Hereinafter, specific embodiments of the first and second implementations of the present invention will be described with reference to the drawings. In the following description, each element is designated as shown in FIG. 1. Specifically, d represents an axial thickness of a single aspherical plano-convex lens, dg represents an axial thickness of a plane parallel glass plate, n represents a refractive index of the single aspherical plano-convex lens, ng represents a refractive index of the plane parallel glass plate, f represents a focal length of the single aspherical plano-convex lens, NA represents a numerical aperture of the single aspherical plano-convex lens, FNO represents an f-number of the single aspherical plano-convex lens, and D represents an effective aperture of the single aspherical plano-convex lens.

The first implementation of the present invention is an improvement of a conventional pickup optical system for an optical disk or a conventional collimator optical system for use in a laser beam printer wherein a single aspherical plano-convex lens and a plane parallel glass plate are provided and the refractive index n of the single aspherical plano-convex lens is set to fulfill n>1.68.

As the first implementation, first to sixth embodiments will be shown. The lens arrangements of the first to sixth embodiments are shown in FIGS. 2, 6, 10, 14, 18 and 22, respectively. Each of the lens systems comprises from the magnification-larger-than-unity side (left side) a single plano-convex lens convex to the magnification-larger-than-unity side and a plane parallel plate. Numerical data of the first to sixth embodiments are shown in Tables 1, 3, 5, 7, 9 and 11, respectively. In the tables, r1 to r4 represent radii of curvature, d1, d2 and dg represent axial distances, and N1 and N2 represents refractive indices at a wavelength of 780 nm. Aspherical coefficients of first surfaces of the first to sixth embodiments are shown in Tables 2, 4, 6, 8, 10 and 12, respectively. The aspherical coefficients are defined by $$X = \frac{c_0 \Phi^2}{1 + \sqrt{1 - \epsilon c_0^2 \Phi^2}} + \sum_i A_i \Phi^i \tag{12}$$

where $\Phi$ represents a height from the optical axis, $\epsilon$ represents a conic constant, $c_0$ represents a paraxial radius of curvature, and $A_i$ represents a high-order parameter. The coefficients which are not shown in the above-mentioned tables are all 0.

FIGS. 3A to 3D, 7A to 7D, 11A to 11D, 15A to 15D, 19A to 19D and 23A to 23D show graphic representations of spherical aberration, sine condition, astigmatism, distortion and lateral chromatic aberration in the fist to sixth embodiments, respectively. FIGS. 4A to 4C, 8A to 8C, 12A to 12C, 16A to 16C, 20A to 20C and 24A to 24C show graphic representations of meridional lateral aberrations on the Gaussian image surface in the first to sixth embodiments, respectively. FIGS. 5A and 5B, 9A and 9B, 13A and 13B, 17A and 17B, 21A and 21B and 25A and 25B show graphic representations of sagittal lateral aberrations on the Gaussian image surface in the first to sixth embodiments.

The first to sixth embodiments are improvements of the lens system disclosed in the previously-mentioned Japanese Laid-open Patent Application No. S61-88213, and are collimator optical systems where the refractive index n is set to fulfill n>1.68. The reason why the upper limit of the condition (4) is 1.89 is as follows: In order to realize a lens where the refractive index n is equal to or larger than 1.89 with, for example, a high-refractive-power, low-dispersion glass, it is necessary to add a large amount of niobium to a heated parent glass material, so that the devitrification occurrence temperature is inevitably high. Since the kinematic viscosity of glass is inferior at this temperature, striae are readily generated. That is, the yield ([the number of usable lenses among processed lenses]/[the number of the processed lenses]) is inferior. Moreover, when the lens material is a high-refractive-index, high-dispersion glass, a high refractive index is realized by the addition of lead. However, such glass is difficult to process.

The condition (5) is a condition for, in order to solve the above-described technical problem, excellently correcting spherical aberration and coma in a lens where the ratio d/D of the axial thickness d to the effective aperture D is relatively small, that is, a lens the assembly of which is easy since the generation amount of coma is relatively small for the decentering amount of the lens. In the case of the single aspherical plano-convex collimator lens, it is possible to independently provide the degree of freedom to each of the parameters contributing to the correction of aberrations; spherical aberration is corrected by the aspherical surface, while coma is corrected by the selection of an axial thickness and a refractive index at the focal length.

Regarding aberration correction of the lens system, if $0.02 < |(d+dg)/(2.631f) - 1 + [1/n(n-1)]| < 0.1$ is fulfilled, coma is excellently corrected, and spherical aberration is also corrected with good balance by providing an appropriate configuration to the aspherical surface. Regarding the lower limit of the condition (5), $\{(d+dg)/(2.631)f - 1 + [1/n(n-1)]\} > -0.15$, and the lower limit is slightly smaller than 0.02, so that the generation amount of outward coma increases. However, when the lens is used in a collimator optical system for use in a laser beam printer, sufficient aberration correction performance is obtained with this range. When the lower limit is exceeded, the generation amount of outward coma is large. When the upper limit is exceeded, the ratio d/D of the axial thickness d to the effective aperture D is large. As a result, although sufficient performance is obtained when the decentering amount is small, the generation amount of come is large when the decentering amount is large. Moreover, the degree of freedom in lens designing is limited and the assembly is difficult.

Figure 26:
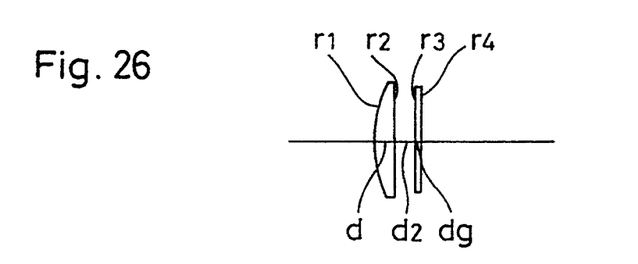
FIG. 26 is a cross-sectional view showing the lens arrangement of a seventh embodiment of the present invention.
Figure 27A:
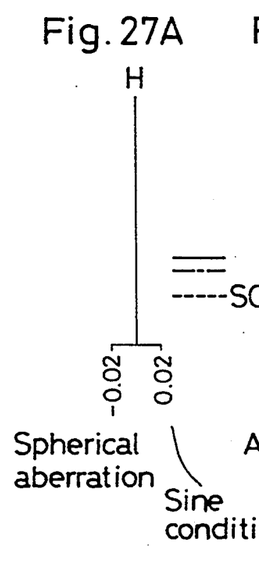
FIGS. 27A to 27D are graphic representations of spherical aberration, astigmatism, distortion and lateral chromatic aberration in the seventh embodiment of the present invention.
Figure 27B:
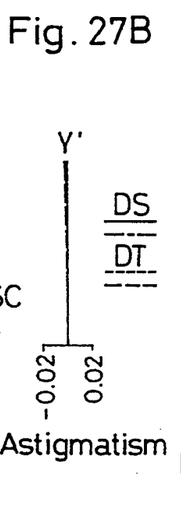
Figure 27C:
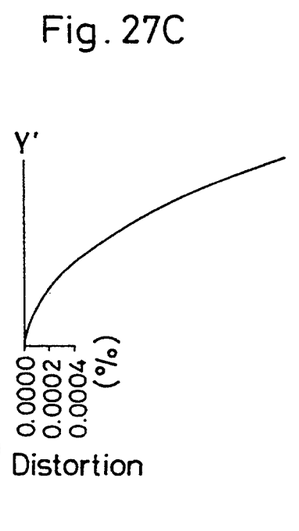
Figure 27D:
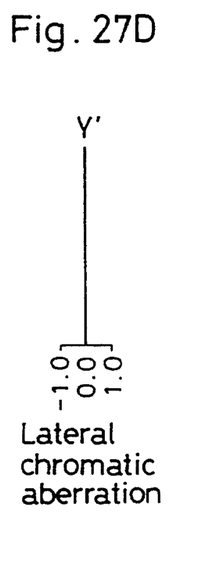
Figure 28A:
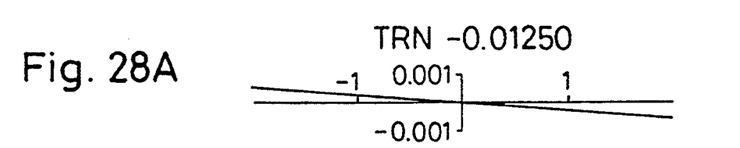
FIGS. 28A to 28C are graphic representations of meridional lateral aberrations on the Gaussian image surface in the seventh embodiment of the present invention.
Figure 28B:
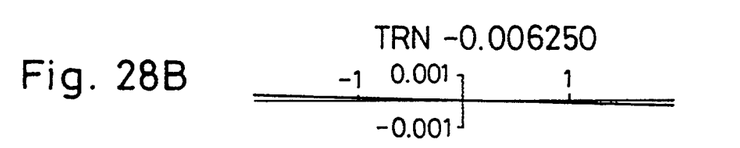
Figure 28C:
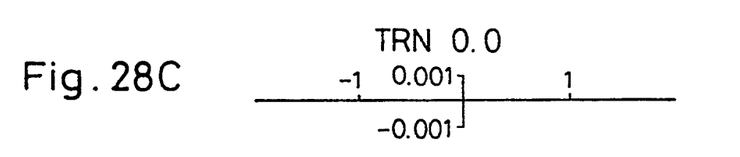
Figure 29A:
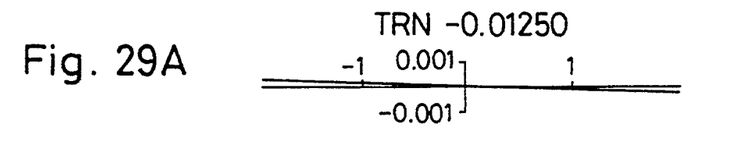
FIGS. 29A and 29B are graphic representations of sagittal lateral aberrations on the Gaussian image surface in the seventh embodiment of the present invention.
Figure 29B:
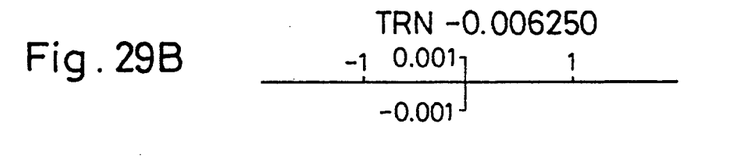
Figure 30:
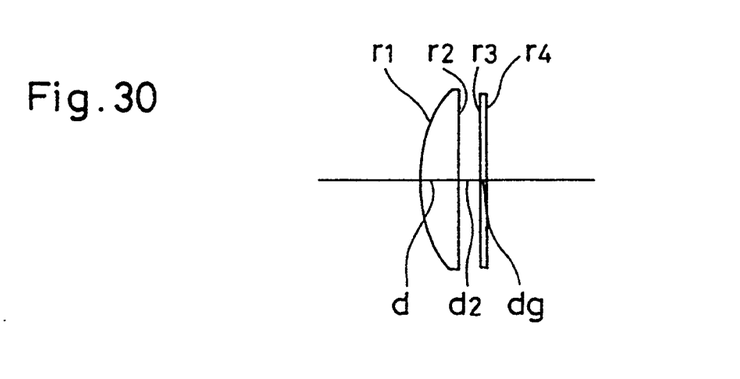
FIG. 30 is a cross-sectional view showing the lens arrangement of an eighth embodiment of the present invention.
Figures 31A, 31B:
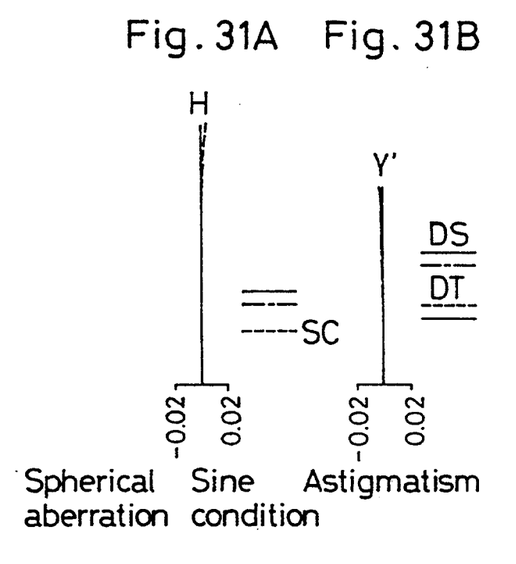
FIGS. 31A to 31D are graphic representations of spherical aberration, astigmatism, distortion and lateral chromatic aberration in the eighth embodiment of the present invention.
Figure 31C:
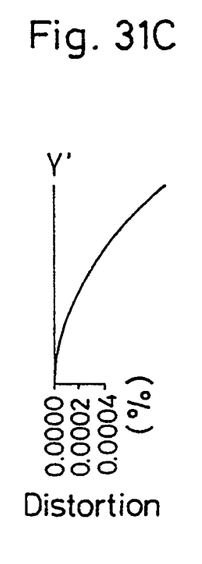
Figure 31D:
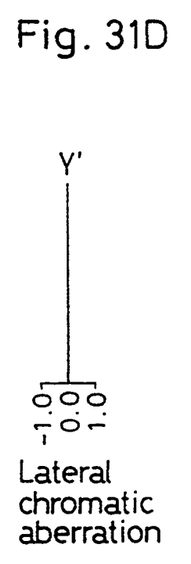
Figure 32A:
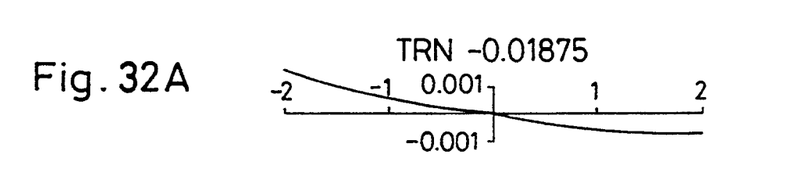
FIGS. 32A to 32C are graphic representations of meridional lateral aberrations on the Gaussian image surface in the eighth embodiment of the present invention.
Figure 32B:
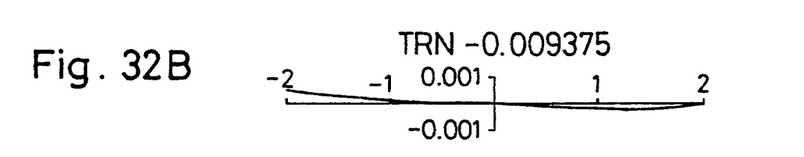
Figure 32C:
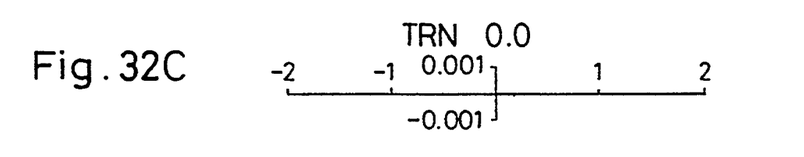
Figure 33A:
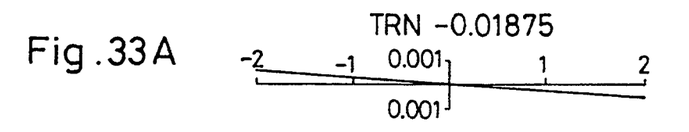
FIGS. 33A and 33B are graphic representations of sagittal lateral aberrations on the Gaussian image surface in the eighth embodiment of the present invention.
Figure 33B:
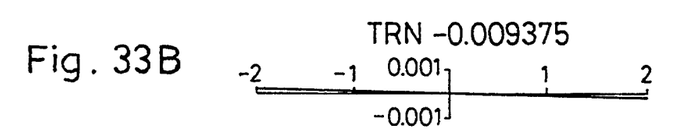
Figure 34:
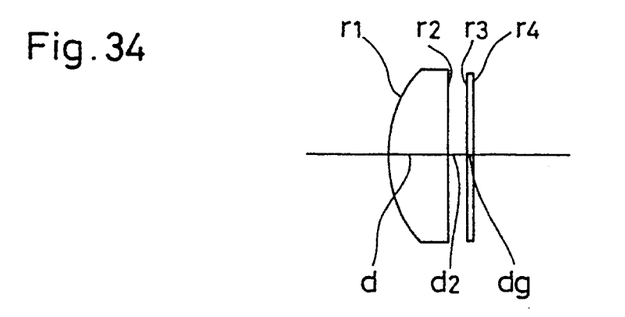
FIG. 34 is a cross-sectional view showing the lens arrangement of a ninth embodiment of the present invention.
Figures 35A, 35B:
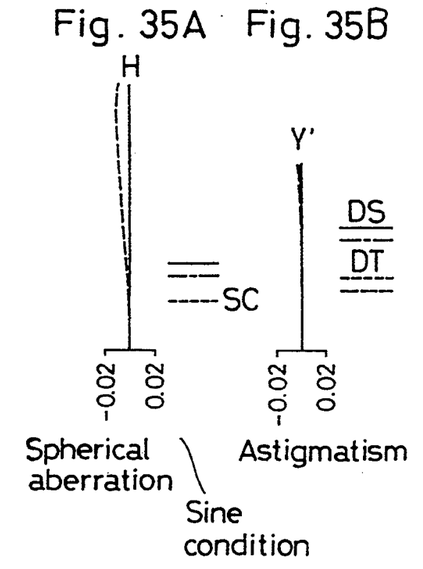
FIGS. 35A to 35D are graphic representations of spherical aberration, astigmatism, distortion and lateral chromatic aberration in the ninth embodiment of the present invention.
Figure 35C:
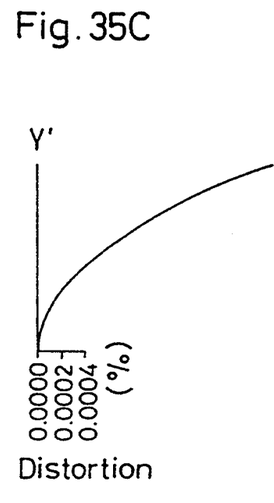
Figure 35D:
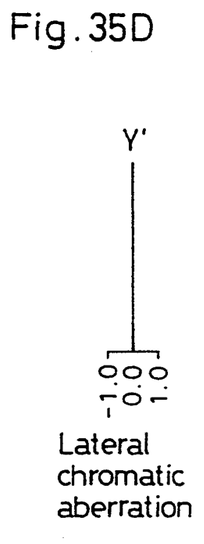
Figure 36A:
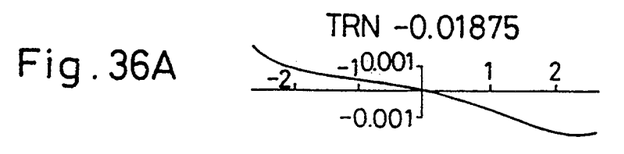
FIGS. 36A to 36C are graphic representations of meridional lateral aberrations on the Gaussian image surface in the ninth embodiment of the present invention.
Figure 36B:
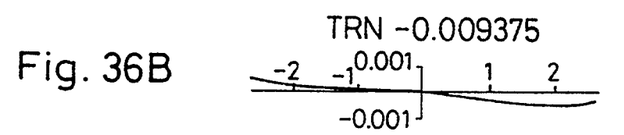
Figure 36C:
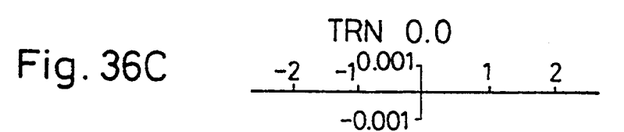
Figure 37A:
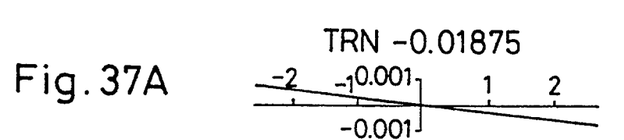
FIGS. 37A and 37B are graphic representations of sagittal lateral aberrations on the Gaussian image surface in the ninth embodiment of the present invention.
Figure 37B:
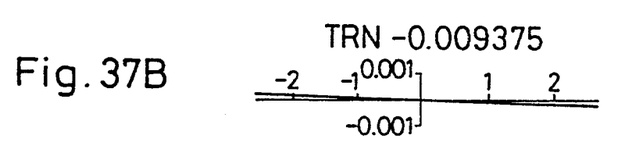

Subsequently, specific embodiments of the second implementation of the present invention will be described. As the second implementation, seventh to ninth embodiments will be shown. The lens arrangements thereof are shown in FIGS. 26, 30 and 34. Each of the seventh to ninth embodiments comprises from the magnification-larger-than-unit side a single plano-convex lens convex to the magnification-larger-than-unity side and plane parallel plate. Numerical data of the seventh to ninth embodiments are shown in Tables 13, 15 and 17, respectively. Aspherical coefficients of the seventh to ninth embodiments are shown in Tables 14, 16 and 18, respectively. Similarly to the first to sixth embodiments, the aspherical coefficients are defined by the equation (12).

FIGS. 27A to 27D, 31A to 31D and 35A to 35D show graphic representations of spherical aberration, sine condition, astigmatism, distortion and lateral chromatic aberration in the seventh to ninth embodiments, respectively. FIGS. 28A to 28C 32A to 32C and 36A to 36C show graphic representations of meridional lateral aberrations on the Gaussian image surface in the seventh to ninth embodiments, respectively. FIGS. 29A and 29B, 33A and 33B and 37A and 37B show graphic representations of sagittal lateral aberrations on the Gaussian image surface in the seventh to ninth embodiments, respectively.

The seventh to ninth embodiments of the second implementation are improvements of a conventional pickup optical system for an optical disk or a conventional collimator optical system for use in a laser beam printer wherein a single aspherical plano-convex lens and a plane parallel plate are provided and the refractive index n of the single aspherical plano-convex lens is set to fulfill n<1.68. Similarly to the lens systems of Japanese Laid-open Patent Applications Nos. S61-88213, S60-187714 and S63-192006, the refractive index n is set to fulfill n>1.68 so that the sine condition is fulfilled.

In these prior arts, however, the f-number is relatively small (3 or smaller) in consideration of the use as a pickup lens for an optical disk. In a collimator optical system for use in a laser beam printer, a lens having a relatively large f-number (1.67 to 5) is generally used at the present time, and it is possible to restrain coma even when the refractive index n is set to fulfill n<1.68.

Within the range $1.2<q<1.5$ of the condition (1) of Japanese Laid-open Patent Application No. S61-88213, coma is not excellently corrected when the refractive index n is n<1.68; coma increases as the refractive index decreases. The second implementation is intended to provide a single aspherical plano-convex lens employable in a collimator optical system where lateral aberrations are in an excellent condition even when the refractive index n is n<1.68.

When the lower limit of the condition (9) is exceeded, the generation amount of coma is so large that it is difficult to correct it. Coma can excellently be corrected only when the condition (9) is fulfilled.

In the above embodiments, coma is excellently corrected by setting (d+dg)/f as described above. In order to increase the effective aperture and angle of view of the lens, however, it is preferably that (d+dg)/f slightly deviates from $2.631\{1-1/n(n-1)\}$. With this setting, not only coma but also spherical aberration can be corrected with good balance.

For example, when the focal length is 5 mm, the maximum image height is 0.15 mm and the f-number is 1.7, by setting the range of $(d+dg)/g$ to be approximately between $2.631\{1.02-1/n(n-1)\}$ and $2.631\{1.03-1/n(n-1)$, aberrations are corrected with good balance.

Obviously, many modifications and variations of the present invention are possible in light of the above teachings. It is therefore to be understood that within the scope of the appended claims, the invention may be practiced other than as specifically described.

TABLE 1

(1st Embodiment)

| Radius of Curvature | Axial Distance | Refractive Index |
|---|---|---|
| r1 3.69076 | | |
| | d1 2.50 | N1 1.73815 |
| r2 ∞ | | |
| | d2 1.00 | |
| r3 ∞ | | |
| | dg 0.25 | N2 1.51118 |
| r4 ∞ | | |

TABLE 2

(1st Embodiment)
Aspherical Coefficients $\xi = 0.100000000$
$A4 = -0.14210814 \cdot 10^{-2}$   $A6 = -0.10772790 \cdot 10^{-3}$
$A8 = -0.27020297 \cdot 10^{-6}$   $A10 = -0.62183791 \cdot 10^{-7}$

TABLE 3

(2nd Embodiment)

| Radius of Curvature | Axial Distance | Refractive Index |
|---|---|---|
| r1 3.41440 | | |
| | d1 2.50 | N1 1.68288 |
| r2 ∞ | | |
| | d2 1.00 | |
| r3 ∞ | | |
| | dg 0.25 | N2 1.51118 |
| r4 ∞ | | |

TABLE 4

(2nd Embodiment)
Aspherical Coefficients $\xi = 0.100000000$
$A4 = -0.17071204 \cdot 10^{-2}$   $A6 = -0.15806042 \cdot 10^{-3}$
$A8 = -0.36311223 \cdot 10^{-6}$   $A10 = -0.39204223 \cdot 10^{-7}$

TABLE 5

(3rd Embodiment)

| Radius of Curvature | Axial Distance | Refractive Index |
|---|---|---|
| r1 3.69076 | | |
| | d1 3.50 | N1 1.73815 |
| r2 ∞ | | |
| | d2 1.00 | |
| r3 ∞ | | |
| | dg 0.25 | N2 1.51118 |
| r4 ∞ | | |

TABLE 6

(3rd Embodiment)
Aspherical Coefficients $\xi = 0.100000000$
$A4 = -0.13166247 \cdot 10^{-2}$   $A6 = -0.10317051 \cdot 10^{-3}$
$A8 = -0.23732924 \cdot 10^{-6}$   $A10 = -0.39380806 \cdot 10^{-7}$

TABLE 7

(4th Embodiment)

| Radius of Curvature | Axial Distance | Refractive Index |
|---|---|---|
| r1 3.69076 | | |
| | d1 1.50 | N1 1.73815 |
| r2 ∞ | | |
| | d2 1.00 | |
| r3 ∞ | | |
| | dg 0.25 | N2 1.51118 |
| r4 ∞ | | |

TABLE 8

(4th Embodiment)
Aspherical Coefficients $\xi = 0.100000000$
$A4 = -0.15247932 \cdot 10^{-2}$   $A6 = -0.11216833 \cdot 10^{-3}$
$A8 = -0.26382387 \cdot 10^{-6}$   $A10 = -0.40099159 \cdot 10^{-7}$

TABLE 9

(5th Embodiment)

| Radius of Curvature | Axial Distance | Refractive Index |
|---|---|---|
| r1 3.23289 | | |
| | d1 1.00 | N1 1.64658 |
| r2 ∞ | | |
| | d2 1.00 | |
| r3 ∞ | | |
| | dg 0.25 | N2 1.51118 |
| r4 ∞ | | |

TABLE 10

(5th Embodiment)
Aspherical Coefficients $\xi = 0.100000000$
$A4 = -0.24907497 \cdot 10^{-2}$   $A6 = -0.10822054 \cdot 10^{-9}$
$A8 = -0.29168330 \cdot 10^{-4}$   $A10 = -0.50879089 \cdot 10^{-5}$

TABLE 11

(6th Embodiment)

| Radius of Curvature | Axial Distance | Refractive Index |
|---|---|---|
| r1 3.97284 | | |
| | d1 4.00 | N1 1.79457 |
| r2 ∞ | | |
| | d2 1.00 | |
| r3 ∞ | | |
| | dg 0.25 | N2 1.51118 |
| r4 ∞ | | |

TABLE 12

(6th Embodiment)
Aspherical Coefficients $\xi = 0.100000000$
$A4 = -0.12101154 \cdot 10^{-2}$   $A6 = -0.84067762 \cdot 10^{-11}$
$A8 = -0.48727619 \cdot 10^{-5}$   $A10 = -0.26118554 \cdot 10^{-5}$

TABLE 13

(7th Embodiment)

| Radius of Curvature | Axial Distance | Refractive Index |
|---|---|---|
| r1 7.536 | | |
| | d1 0.95 | N1 1.62803 |
| r2 ∞ | | |
| | d2 1.00 | |
| r3 ∞ | | |
| | dg 0.25 | N2 1.51118 |
| r4 ∞ | | |

TABLE 14

(7th Embodiment)
Aspherical Coefficients

$\xi = 0.100000000$
$A4 = -0.17752221 \cdot 10^{-3}$   $A6 = -0.24134606 \cdot 10^{-5}$
$A8 = -0.28720536 \cdot 10^{-7}$   $A10 = -0.41585516 \cdot 10^{-9}$

TABLE 15

(8th Embodiment)

| Radius of Curvature | Axial Distance | Refractive Index |
|---|---|---|
| r1 5.356 | | |
| | d1 1.968 | N1 1.66953 |
| r2 ∞ | | |
| | d2 1.000 | |
| r3 ∞ | | |
| | dg 0.250 | N2 1.51118 |
| r4 ∞ | | |

TABLE 16

(8th Embodiment)
Aspherical Coefficients

$\xi = 0.100000000$
$A4 = -0.48694439 \cdot 10^{-3}$   $A6 = -0.13441845 \cdot 10^{-4}$
$A8 = -0.30779343 \cdot 10^{-6}$   $A10 = -0.10653265 \cdot 10^{-7}$

TABLE 17

(9th Embodiment)

| Radius of Curvature | Axial Distance | Refractive Index |
|---|---|---|
| r1 5.356 | | |
| | d1 3.07 | N1 1.66953 |
| r2 ∞ | | |
| | d2 1.00 | |
| r3 ∞ | | |
| | dg 0.25 | N2 1.51118 |
| r4 ∞ | | |

TABLE 18

(9th Embodiment)
Aspherical Coefficients

$\xi = 0.100000000$
$A4 = -0.46742356 \cdot 10^{-3}$   $A6 = -0.13251818 \cdot 10^{-4}$
$A8 = -0.26408433 \cdot 10^{-6}$   $A10 = -0.14088208 \cdot 10^{-7}$

What is claimed is:

1. A collimator lens system comprising from a magnification-larger-than-unity side a single plano-convex lens convex to the magnification-larger-than-unity side and a plane parallel plate, wherein the convex surface of the single plano-convex lens is aspherical and wherein the following conditions are fulfilled:

$$1.68 < n < 1.89$$

$$2.631 \left( 0.85 - \frac{1}{n(n-1)} \right) < \frac{d + dg}{f} < 2.631 \left( 1 - \frac{1}{n(n-1)} \right)$$

where n represents a refractive index of the single plano-convex lens, d represents an axial thickness of the single plano-convex lens, f represents a focal length of the single plano-convex lens and dg represents a thickness of the plane parallel plate.

2. A collimator lens system as claimed in claim 1, wherein the following condition is further fulfilled:

$$2.631 \left( 0.90 - \frac{1}{n(n-1)} \right) < \frac{d + dg}{f}.$$

3. A collimator lens system as claimed in claim 1, wherein the following condition is further fulfilled:

$$2.631 \left( 0.95 - \frac{1}{n(n-1)} \right) < \frac{d + dg}{f}.$$

4. A collimator lens system comprising from a magnification-larger-than-unity side a single plano-convex lens convex to the magnification-larger-than-unity side and a plane parallel plate, wherein the convex surface of the single plano-convex lens is aspherical and wherein the following conditions are fulfilled:

$$n < 1.68$$

$$\frac{d + dg}{f} < 2.631 \left( 1.15 - \frac{1}{n(n-1)} \right)$$

where n represents a refractive index of the single plano-convex lens, d represents an axial thickness of the single plano-convex lens, f represents a focal length of the single plano-convex lens, and dg represents a thickness of the plane parallel plate.

5. A collimator lens system as claimed in claim 4, wherein the following condition is further fulfilled:

$$\frac{d + dg}{f} < 2.631 \left( 1.10 - \frac{1}{n(n-1)} \right).$$

6. A collimator lens system as claimed in claim 4, wherein the following condition is further fulfilled:

$$\frac{d + dg}{f} < 2.631 \left( 1.05 - \frac{1}{n(n-1)} \right).$$

* * * * *